July 1, 1969  G. DE CRESCENZO  3,452,752
VAGINAL PESSARY
Filed Sept. 8, 1966

INVENTOR.
GIUSEPPE DE CRESCENZO

United States Patent Office 3,452,752
Patented July 1, 1969

3,452,752
VAGINAL PESSARY
Giuseppe De Crescenzo, Corso Lodi 110, Milan, Italy
Filed Sept. 8, 1966, Ser. No. 578,004
Claims priority, application Italy, Sept. 14, 1965,
20,502/65
Int. Cl. A61f *13/20, 5/46*
U.S. Cl. 128—285                               1 Claim

ABSTRACT OF THE DISCLOSURE

A vaginal pessary including an absorbent resin body, an open-ended container for the body, and a thimble-shaped gelatin capsule which houses the body and container when the body and container are compressed. When the unit is placed into the vagina, the capsule dissolves and permits the body to expand.

This invention relates to an absorbent pessary for fitting in the vagina for the purpose of absorbing the menstrual discharge.

More particularly, the absorbent pessary according to the invention is characterised in that it comprises a body of expanded synthetic resin through which a passage passes, a ring made of rubber or the like connected to the synthetic resin body by means of cord which passes through the passage in the body and terminates on the ring with the formation of a loop, and a substantially thimble-shaped gelatin capsule, the volume of which is substantially less than that of the expanded synthetic resin body, this capsule being intended to contain the body when it is squeezed and therefore of reduced volume, on the introduction of the pessary into the vagina.

According to a feature of the invention the pessary also comprises a container of adhesive rubber or the like, open at one end, adapted to contain the expanded synthetic resin body and formed with an aperture in alignment with the aperture in the expanded synthetic resin body for the passage of the cord carrying the ring made of rubber or the like.

According to another feature of the invention, a sheet of adhesive rubber or the like is attached to one surface of the expanded synthetic resin body.

Specific embodiments of the invention will now be described by way of example with reference to and as illustrated by the accompanying drawings in which.

Figure 1:
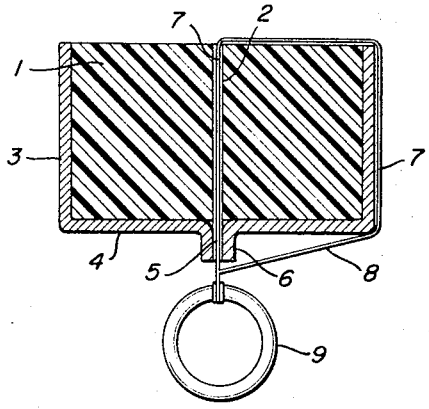
FIGURE 1 is an axial section of a pessary according to the invention before introduction into the gelatin capsule.
Figure 2:
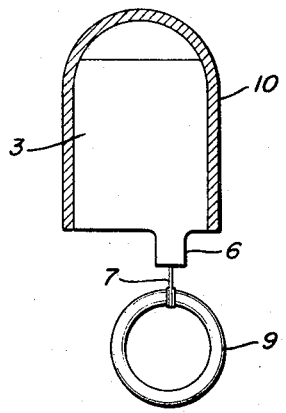
FIGURE 2 is a partial axial section of the pessary in FIGURE 1 after introduction into the gelatin capsule.
Figure 3:
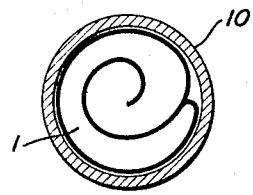
FIGURE 3 is a simplified plan view, partly in section, of the pessary according to the invention in the same state as in FIGURE 2.

With reference to FIGURES 1 to 3, the pessary comprises a cylinder 1 of expanded synthetic resin, preferably polyurethane resin, which is formed with an axial passage 2 and received in a cylindrical container 3 made of adhesive rubber, open at one end and closed at the opposite end by a base 4 having at the centre an aperture 5 bounded by a tubular projection 6. A silk cord 7 passes through the passage 2, over the exposed surface of the expanded synthetic resin cylinder 1 and over the side surface of the container 3, and is joined to the end of the cord issuing from the projection 6 so as to form a loop 8 to which a rubber extracting ring 9 is attached.

To assemble the absorbent pessary hereinbefore described, the expanded synthetic resin cylinder 1 is introduced into the adhesive rubber container 3 so that the passage 2 is in line with the aperture 5 of the adhesive rubber container 3.

The silk cord 7 carrying the rubber ring 9 is then introduced into the passage 2, and a loop 8 which ties the pessary is formed.

The pessary formed in this way is rolled up manually so that it is very narrow longitudinally, and introduced into a gelatin capsule 10 (see FIGURES 2 and 3) with the free surface of the expanded resin cylinder, i.e. the surface that it is not covered by the adhesive rubber container 3, facing the cap of the gelatin covering.

At this point the pessary is ready to be introduced easily into the vagina.

As soon as the pessary has been introduced into the vagina, the gelatin capsule, in contact with the fluids of the organism and as a result of body temperature, dissolves and releases the pessary. The latter is then ready to absorb and arrest the fluids retained in the pessary by the adhesive rubber container 3, which prevents them from spreading.

When the pessary has performed its function of absorbing and collecting the fluid, the latter can be extracted by pulling the rubber ring 9.

Figure 4:
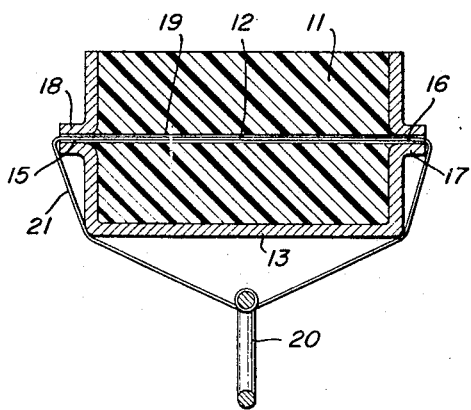
FIGURE 4 is an axial section of a variant of the pessary according to the invention before introduction into the gelatin capsule.

FIGURE 4 shows a variant of the pessary, the expanded resin cylinder 11 of which has a transverse passage 12 corresponding to the axial passage in the pessary in FIGURES 1 to 3. As a result, the adhesive rubber container 13 has two diametrically opposite apertures 15, 16 in line with the passage 12 and bounded by tubular projections 17 and 18 respectively on the adhesive rubber container 13. A silk cord 19, connected by one end to a rubber extracting ring 20, passes through the aligned apertures 15, 12, 16 and over the outer surface of the container 13, so as to terminate at the point at which is began and form a loop 21.

The pessary in FIGURE 4 is assembled, introduced and extracted in the same way as the pessary in FIGURES 1 to 3.

Figure 5:
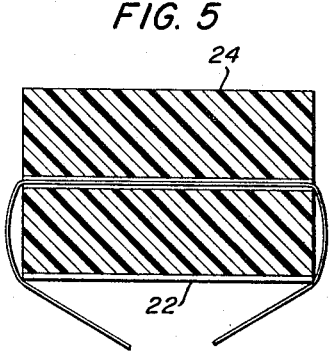
FIGURE 5 is an axial section of another variant of the pessary according to the invention before introduction into the gelatin capsule.

FIGURE 5 shows a greatly simplified variant of the pessary according to the invention. In this variant, instead of the container 3 and 13 respectively of the embodiments hereinbefore described, a simple sheet of adhesive rubber 22 produced by immersion of one end surface of the cylinder in rubber latex or by immersion in rubber solution and adhering to the expanded resin cylinder 24 is used.

Figure 6:
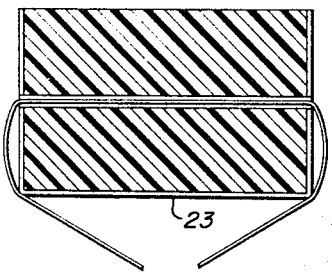
FIGURE 6 is an axial section of another variant of the pessary according to the invention before introduction into the gelatin capsule.

FIGURE 6 shows another variant of the pessary according to the invention. In this variant, instead of the container 3 and 13 respectively of the embodiments hereinbefore described, a simple sheet of adhesive rubber 23 produced by immersing one end surface and the perimetral surface of the expanded resin cylinder in rubber latex or by immersion in rubber solution is used. Such sheets made of rubber latex or rubber solution adhere closely to the expanded resin cylinder and form a single body therewith.

In practice, only one end surface and part of the perimetral surface of the cylindrical surface of the expanded resin body need to covered with the adhesive rubber sheet, the cylinder being only partly immersed in rubber latex or rubber solution. Furthermore, the length of the gelatin capsule may be less than the height of the expanded resin cylinder, as its sole function is to permit the introduction of the pessary. In this way the capsule will dissolve more easily as it is made of a smaller quantity of gelatin.

The use of the expanded resin cylinder as an absorbent body has the advantage that good absorption is obtained as the body comprises a series of small communicating cells and the whole of its volume therefore acts as an absorbent sponge.

Although only certain embodiments of the invention have been described, many variants and modifications can clearly be made without going beyond the scope of the invention.

It will be seen that apart from the use of the pessary of the invention for absorbing menstrual discharge, it may also be used as a contraceptive device.

I claim:
1. An absorbent pessary comprising a body of expanded synthetic resin having a passage therein, a container formed of adhesive rubber-like material and being open at one end, the container being of a volume to contain the expanded resin body, a passage in the container in alignment with the passage in the body, a cord running through said passages and forming a loop, a ring connected to the loop and thereby connected to the body, and a substantially thimble-shaped gelatin capsule, the capsule being of a volume less than the volume of the expanded resin body and adapted to contain the body when the body is compressed therein.

References Cited

UNITED STATES PATENTS

| | | | |
|---|---|---|---|
| 1,887,526 | 11/1932 | Spielberg et al. | 128—285 |
| 2,440,141 | 4/1948 | Donovan | 128—285 |
| 2,491,017 | 12/1949 | Robinson | 128—285 |
| 2,884,925 | 5/1959 | Meynier | 128—285 |
| 3,128,767 | 4/1964 | Nolan | 128—285 |
| 3,306,966 | 2/1967 | Matejcek et al. | 128—285 |
| 3,347,237 | 10/1967 | Jones | 128—285 |

FOREIGN PATENTS 945,000   12/1963   Great Britain.

CHARLES F. ROSENBAUM, *Primary Examiner*.

U.S. Cl. X.R.

117—113, 138.8, 162